June 27, 1933.  W. B. BARNES  1,915,643
CLUTCH
Filed Feb. 26, 1931   2 Sheets-Sheet 1

Inventor
WILLIAM B. BARNES,
By Ashley Trask
Attorneys

Inventor
WILLIAM B. BARNES,
By Ashley Frask
Attorneys

Patented June 27, 1933

1,915,643

UNITED STATES PATENT OFFICE

WILLIAM B. BARNES, OF AUBURN, INDIANA

CLUTCH

Application filed February 26, 1931. Serial No. 518,367.

My invention relates to clutches of the type in which a helical clutching element is employed to interconnect two relatively rotatable clutch members in such a manner that when the two members tend to rotate relative to each other the clutching element undergoes a change of diameter and, as the result of the torque which it transmits, is forced into firm frictional engagement with a clutching surface provided on one of the clutch members.

It has previously been proposed to construct clutches of this type in such a manner that the operative connection between the clutch members through the helical element may be selectively completed or interrupted by control mechanism in order to render the clutch operative or inoperative at will. Such clutches operate in a manner which may be termed "self-energizing" in that the frictional grip of the helical clutching element on the co-operative clutching surface results from the torque transmitted through the clutching element and automatically increases as the torque increases, thus distinguishing clutches of this type from other frictional clutches in which the friction between frictionally engaging members results wholly from effort externally applied through the control mechanism.

It is the object of my invention to produce a clutch that will embody a helical clutching element, which may be rendered operative or inoperative at will, and which will be self-energizing irrespective of the direction in which the two clutch members tend to rotate.

A further object of my invention is to produce such a clutch which may be controlled to prevent relative rotation of the clutch members in one direction but to permit their free relative rotation in the other direction.

In carrying out my invention, I employ two clutch members one of which is provided with a clutching surface adapted to be engaged by the helical clutching element previously referred to. The ends of the clutching element are both connected to the other clutch member through connections which permit sufficient relative angular movement of the ends of the clutching element to cause the clutching element to engage or recede from the clutching surface on the first named clutch member. This control mechanism for the clutch takes the form of means for causing relative angular movement of the ends of the clutching element or for permitting such relative angular movement under the influence of relative rotation of the clutch members.

The accompanying drawings illustrate a preferred mechanical embodiment of my invention and three modified forms thereof, all of which are illustrative of the idea of my invention the scope of which is to be measured by the appended claims.

Referring to the drawings in detail and considering first that form of the invention illustrated in Figures 1 to 5 inclusive, it will be observed that my improved clutch device is operative to releasably connect together a pair of aligned rotatable shafts, one of which will ordinarily drive the other when the two are connected by the clutch. For the purpose of this description it will be assumed that the shaft 11 is the driving shaft and transfers power through the clutch structure to the driven shaft 9. The shaft 9 is provided in the end thereof with a bearing well into which projects the reduced end portion of the shaft 11 and is also provided with a cylindrical cup 10 having an annular or circular interior bearing wall which surrounds the portion of the driving shaft 11 adjacent to the reduced end thereof. An anti-friction bearing may be disposed between the reduced end portion of the shaft 11 and the shaft 9 so that except for the clutch structure mentioned above, the shafts 9 and 11 are freely rotatable relative to each other. A multiple-wound spiral spring 12 having, when unstressed, an outside diameter slightly less than the diameter of the annular bearing wall of the cup 10, is positioned between the cup and the end portion of the shaft 11 which the cup overlies.

Figures 1, 2:
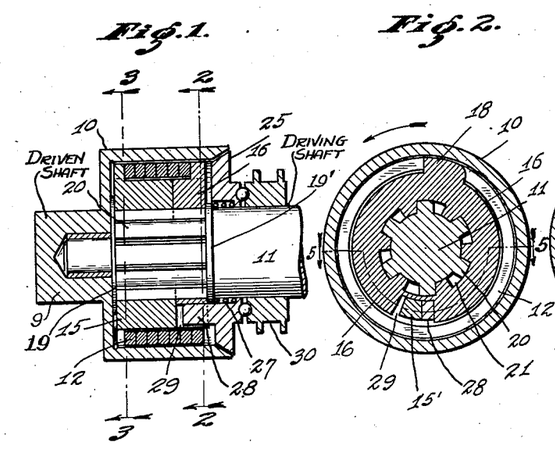
Figure 1 is a longitudinal sectional view of a preferred form of clutch mechanism constructed according to the idea of this invention.
Figure 2 is a transverse sectional view taken on the line 2—2 of Figure 1, looking in the direction of the arrows.
Figure 3:
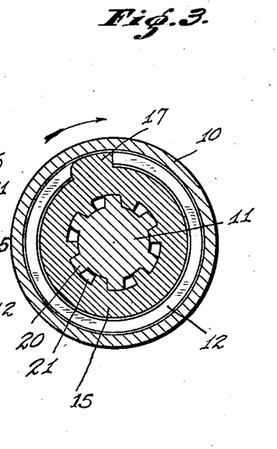
Figure 3 is a transverse sectional view taken on the line 3—3 of Figure 1, looking in the direction of the arrows.
Figure 4:
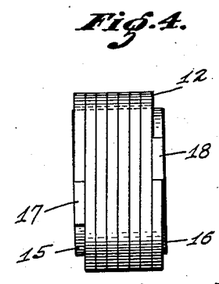
Figure 4 is an elevational view of a clutch spring and a pair of clutch spring actuating members used in the preferred form of the invention.

In the present disclosure, I have shown, for the purpose of illustration, a left-hand spring, and the spring actuating mechanism presently to be described is therefore constructed for this type of spring. It is to be understood, however, that a right-hand spring may be used with equal facility and, with the proper spring actuating mechanism, will produce the same results. The internal diameter of the spring 12 is materially greater than the external diameter of the shaft 11, and a pair of spring actuating elements 15 and 16 are disposed in the annular space between the spring and the shaft. These spring actuating members 15 and 16 are in the form of coaxial annular rings mounted upon the shaft 11 in abutting relation and are provided with spring abutments 17 and 18 respectively projecting radially outwardly from the main body of the rings and against which the ends of the spring 12 are adapted to bear in a tangential or circumferential direction. These spring actuating members are maintained against axial separation on the shaft 11 by means of a thrust washer 19 bearing against the inner face of the shaft 9 and an integral collar 19' formed on the shaft 11 approximately in radial alignment with the outer edge of the cup 10. Between the washer 19 and the collar 19' the shaft 11 is provided with longitudinal splines as indicated at 20 and the spring actuating members 15 and 16 are provided with cooperating splines as indicated at 21 in Figures 2 and 3 to provide a rotatable driving connection between the driving shaft 11 and the spring actuating members. As illustrated in Figures 2 and 3, in both sets of splines 20 and 21 the keyways are of materially greater angular width than the splines to provide for a limited rotation or oscillation of the members 15 and 16 relative to the shaft 11 for a purpose to be later described.

The ends of the spring 12 are so located relative to each other that when the spring and the two spring actuating members 15 and 16 are mounted upon the splined portion of the shaft 11, and the abutments 17 and 18 are disposed against the respective ends of the spring, the abutments 17 and 18 will be forced apart to the limit of the relative rotation of the spring actuating members 15 and 16 upon the shaft 11, the member 16 being rotated in a direction opposite to the direction of the arrow shown on Figure 2 and the member 15 being rotated in a direction opposite to the direction of the arrow shown on Figure 3. It will be observed, however, from an inspection of Figures 2 and 3, that the pressure exerted upon the abutments 17 and 18 is not sufficient to unwind the spring 12 to such an extent that its outside diameter will increase until the spring comes in contact with the annular bearing surface of the cup 10. In the assembled relation of the parts as just described, the cup 10 will rotate freely in either direction relative to the spring and to the spring actuating members 15 and 16. However, if either of the spring actuating members 15 or 16 should now be moved through the limit of its oscillatory rotation relative to the shaft 11, it will unwind the spring a slight amount, as the other member cannot move in the same direction, and the dimensions of the spring 12 and the cup 10 are so arranged that this slight amount of unwinding will bring the exterior surface of the spring in contact with the interior surface of the cup 10 and set up a frictional resistance between the spring and the cup tending to further unwind the spring to provide a driving connection between the shafts 9 and 11. For example, with the left-hand wound spring illustrated in connection with the form of device illustrated in Figures 1 to 5 inclusive, if the spring actuating member 16 be moved in the direction of the arrow on Figure 2 to unwind the spring, and the direction of rotation of the spring is in a direction opposite that indicated by the arrow on Figure 2, as soon as a frictional contact is established between the exterior of the spring at the right-hand end thereof, as illustrated in Figure 1, and the interior of the cup 10, the relative motion of these two parts will cause the spring to further unwind to establish a firm clutching grip or driving connection between the spring and the cup whereupon power or torque will be transferred from the driving shaft 11 through the actuating member 15 and the abutment 17 to the spring 12 and from the spring 12 to the cup 10 to provide a driving connection between the shaft 11 and the shaft 9.

Similarly, if the direction of rotation of the shaft 11 and spring 12 be reversed to that described above to the direction of the arrow in Figure 2, and the member 15 be actuated in the direction of the arrow on Figure 3 to unwind the spring, a driving connection will be built up between the spring and the cup 10 and torque will be transmitted from the shaft 11 through the actuating member 16, the abutment 18 and the spring 12 to the cup 10 to establish a driving connection between the shafts 11 and 9.

For the purpose of controlling the clutch, I provide an axially movable control member 25 which is freely rotatable relative both to the shaft 11 and the cup 10, the cup 10 being provided with a conical surface at its open end adapted to be engaged by a complementary tapered surface on the periphery of the control member 25 when the latter is moved to the left from the position illustrated in Figure 1. The collar 19' besides maintaining the clutch actuating members 15 and 16 against axial motion, also serves as an abutment for a coiled compression spring 27 which surrounds the shaft 11 in an annular offset provided in the control member 25. The control member 25 is provided with an abutment bearing against the end of the compression spring opposite the collar 19' so that the spring tends to hold the control member out of engagement with the cup 10. When it is desired to engage the clutch to cause the cup 10 to be connected to the drive shaft 11, the control member 25 is moved to the left as illustrated in Figure 1 against the resilient pressure of the spring 27, this movement being effected through the medium of a shifter collar 30 which surrounds the shaft 11 in abutting relation with the control member 25. If desired, an anti-friction thrust bearing may be interposed between the shifter collar and the control member as illustrated in Figure 1.

Figure 5:
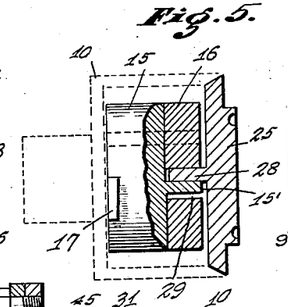
Figure 5 is an elevational view of the clutch spring actuating element used in the preferred form of the invention taken on line 5—5 of Fig. 2, a portion thereof being broken away to better illustrate the construction thereof.

As particularly illustrated in Figures 1, 2 and 5, the control member 25 is provided with an axially directed lug 28 which projects into a radial notch 29 formed in the outer surface of the spring actuating member 16. As illustrated in Figures 2, 3 and 5, the radial notch 29 is materially wider than the lug 28 and an axially directed lug 15' on the spring actuating member 15 also projects into the notch 29 in lateral contact with the lug 28, the relation of the lugs 28 and 15' and the slot 29 being particularly illustrated in Figure 5. From an inspection of Figure 2. it will be observed that the lug 15' abuts against the left side of the lug 28 and the opposite side of the lug 28 abuts against the side of the radial slot 29. With this relation of the parts, the operation of the device is as follows:

Assuming that the driven shaft 9 and the cup 10 are stationary and that the driving shaft 11, together with the clutch structure comprising the elements 15 and 16, the spring 12, and the control member 25, is rotating in the direction of the arrow on Figure 2 with the control member 25 out of engagement with the cup 10, the shaft 11 and the clutch mechanism will rotate freely relative to the driven shaft 9. If now, the control member 25 be moved to engage the cup 10 a restraining force will be applied to the lug 15' and the spring actuating member 15 causing this member to move relative to the shaft 11 in the direction of the arrow on Figure 3, thereby unwinding the spring 12 and causing a driving connection to be established through the spring actuating member 16, the spring 12 and the cup 10 from the driving shaft 11 to the driven shaft 9.

If on the other hand, the driving shaft 11 together with the clutch mechanism be rotating in the opposite direction from that described above, that is in the direction of the arrow on Figure 3, and the control member 25 be brought into frictional engagement with the stationary cup 10, a restraining force will be applied to the spring actuating element 16 causing this element to move relative to the shaft 11 in the direction of the arrow on Figure 2, thereby unwinding the spring and causing a driving connection to be established through the spring actuating member 15, the spring 12 and the cup 10 to the driven shaft 9.

It will, therefore, be apparent that in the operation of the clutch device illustrated in Figures 1 to 5 inclusive, when the control member 25 is out of engagement with the cup 10, the driving shaft 11 cannot drive the driven shaft 9 in either direction of rotation but that when the control element 25 is in frictional engagement with the cup 10, the driving shaft 11 will drive the driven shaft 9 in either direction of rotation. It is also apparent that if the application of power be reversed, the mechanism above described will function to cause the shaft 9 to drive the shaft 11 in either direction of rotation if the control element 25 is in frictional contact with the cup 10.

Figure 6:
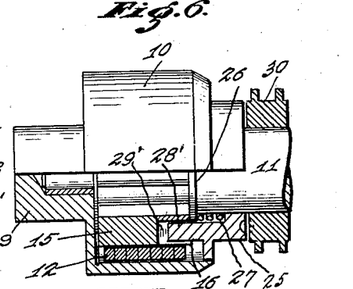
Figure 6 is a longitudinal view, partly in elevation and partly in section, showing the construction of a somewhat modified form of clutch.
Figures 7, 10:
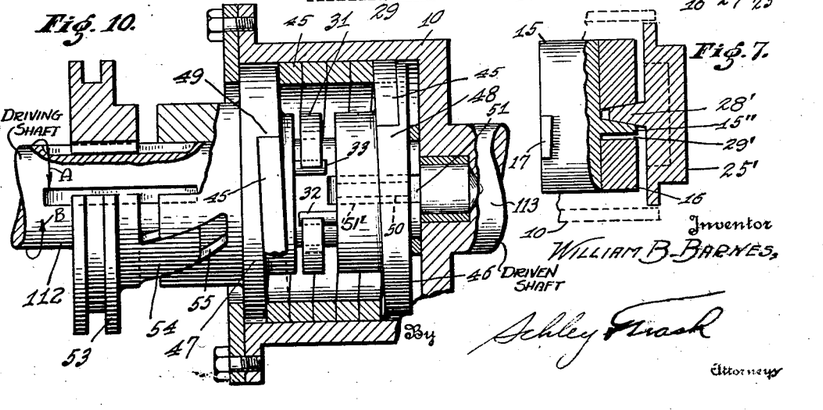
Figure 7 is an elevational view of the clutch spring actuating element used in the form of clutch illustrated in Figure 6, a portion thereof being broken away to better illustrate the construction thereof.
Figure 10 is a longitudinal sectional view of another modification of the device of the invention.

In the modified form of the device illustrated in Figures 6 and 7, the same elements are used in the same relation as in the preferred form of the device described above, except that in this latter case the control element 25' has no frictional contact with the cup 10. The action causing unwinding of the spring 12 is produced by a tapered or wedge-shaped lug 28' on the control member 25' which projects into a radial slot 29' in the member 16 between an angularly disposed wall of the slot and a tapered or wedge-shaped lug 15'' projecting from the spring actuating member 15.

From the relation of these elements as particularly illustrated in Figure 7 it will be observed that axial movement of the control member 25' toward the left forces the wedge-shaped lug 28' between the wall of the radial slot 29' and the wedge-shaped lug 15'', thereby rotating the spring actuating members 15 and 16 in opposite directions to unwind the spring 12 and cause the exterior surface of the spring to come into frictional contact with the interior surface of the cup 10 to establish a driving connection between the shafts 11 and 9 in the manner described above.

Figures 8, 9:
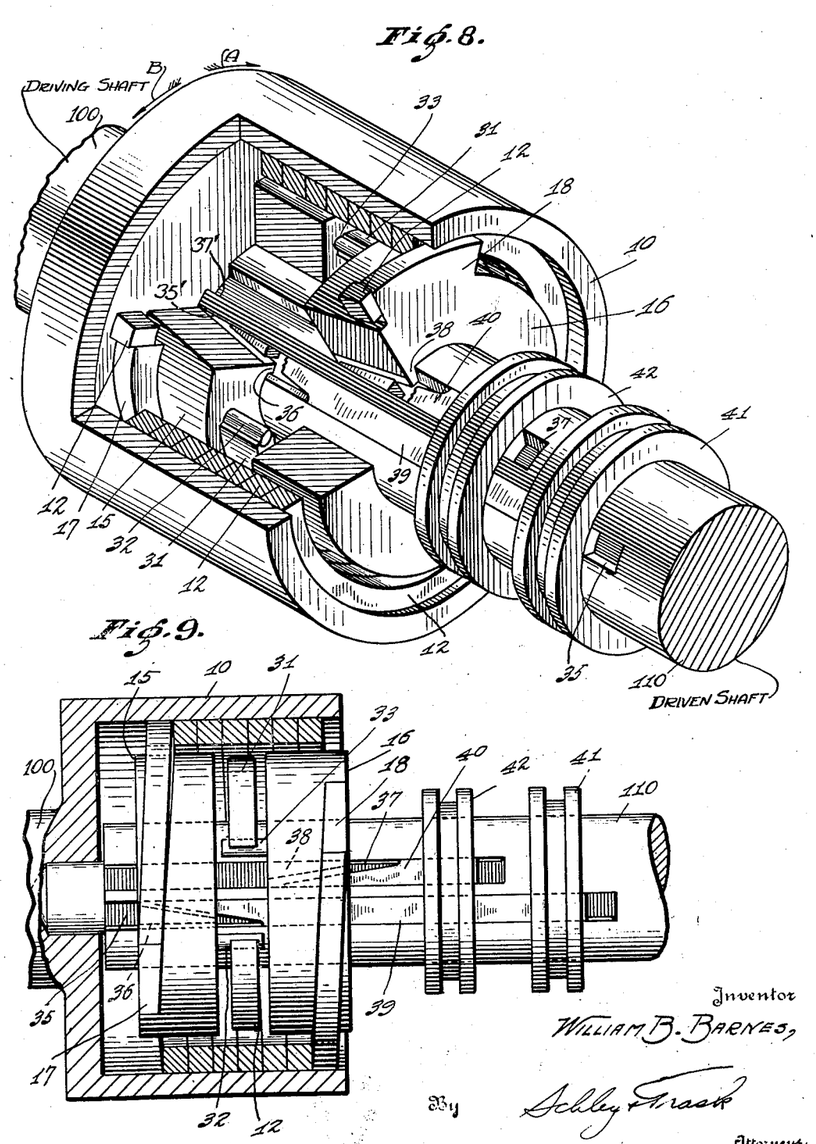
Figure 8 is a perspective view of a still further modified form of the device of the invention, portions being shown in section to better illustrate the construction thereof.
Figure 9 is a longitudinal sectional view of the form of clutch illustrated in Figure 8.

In the form of the invention illustrated in Figures 8 and 9, the driving and driven shafts are shown in reversed position to the shafts in the preceding views. In these views, I employ a driving shaft 100 (left-hand shaft) having a cup 10 formed on one end thereof overlying the corresponding end of a co-axial driven shaft 110 (right-hand shaft). In this form of the invention the clutch spring 12 is also a multiple-wound spiral spring of substantially rectangular cross section having an outside diameter, when unstressed, slightly less than the diameter of the interior bearing surface of the cup-shaped member 10. The two actuating members 15 and 16 have respectively the abutments 17 and 18 which engage the respective ends of the spring as described above. The members 15 and 16, however, in this form of the invention, are not mounted in abutting relation upon the driven shaft 110 but are axially spaced from each other in order to provide space for a resilient spring member 31, the opposite ends of which bear respectively on pins 32 and 33 which extend toward each other from the actuating members 15 and 16 respectively, as is clearly illustrated in Figure 9. The spring ring 31 exerts a force on the pins 32 and 33 sufficient to cause the two actuating members 15 and 16 to be reversely rotated relatively to each other to such an extent that the spring 12 will be expanded into engagement with the inner surface of the cup 10. As particularly illustrated in Figure 8, the driven shaft 110 is provided with longitudinal slots or keyways 35 and 37 into which project teeth or keys 36 and 38 formed on the spring actuating members 15 and 16 respectively. As in the forms of the invention above described, the slots 35 and 37 are materially wider than the teeth 36 and 38 in order to permit rotational movement of the members 15 and 16 relative to the shaft 110 and relative to each other to allow for unwinding and winding of the spring 12 into and out of frictional engagement with the inner surface of the cup 10.

While for the purpose of simplicity and illustration I have shown only two slots in the driven shaft 110 and only one tooth on each of the members 15 and 16, it will be understood that I may use complete sets of co-operating splines, as illustrated in Figures 2 and 3, if desired.

In this form of the invention the parts are so related that when the spring 12 is unwound by the action of the spring ring 31 into gripping relation with the interior surface of the cup 10, the keys or teeth 36 and 38 lie against the inner edges 35' and 37' of the slots or keyways 35 and 37 respectively, but a rotational motion of one of the members 15 or 16, such as to bring the respective tooth 36 or 38 to approximately the center of the respective keyway 35 or 37, is sufficient to permit the spring to wind up the amount necessary to completely release the frictional engagement between the spring 12 and the cup 10.

In this form of the invention, I have provided a manual control which permits a one-way drive in either direction as well as a two-way drive in both directions.

From an inspection of Figure 8, it will be observed that the sides of the teeth 36 and 38 adjacent to the inner edges 35' and 37' of the keyways 35 and 37 are disposed at an angle to the said edges of the keyways so that the sides of the teeth diverge from the edges of the keyways toward the open end of the cup 10, and that in the keyways 35 and 37 I have provided axially slidable keys 39 and 40 respectively, having wedge-shaped end portions within the clutch structure adapted to be inserted between the inner edges 35' and 37' of the keyways 35 and 37 and the angularly disposed sides of the teeth 36 and 38 respectively, to rotate the spring actuating members 15 and 16 in opposite directions relative to each other by the wedging action of the tapered ends of the keys between the sides of the teeth and the inner edges 35' and 37' of the respective keyways. Outside of the clutch structure these keys 39 and 40 are rigidly connected to axially slidable shift collars 41 and 42 respectively, by means of which the keys may be manually moved axially in the keyways in the shaft 110.

While the major elements of the form of the invention illustrated in Figures 8 and 9 are substantially the same as in the forms described above, the addition thereto of the spring ring 31 and the slidable keys 39 and 40 render the operation of this form of the invention somewhat different from the operation of the devices shown in the previous views. In the form of the invention illustrated in Figures 8 and 9, the spring ring 31 tends to unwind the spring 12 to such an extent that frictional contact is maintained between the spring 12 and the interior surface of the cup 10 so long as the wedge-shaped ends of the keys 39 and 40 are out of operative contact with the teeth 36 and 38. Therefore, with the shift collars 41 and 42 moved to the right as viewed in Figure 9, the clutch is a two-way acting clutch functioning in the same manner as the device in Figures 1 to 5.

When both of the shift collars 41 and 42 as viewed in Figure 9, are moved to the left to the extent of their travel, the wedge-shaped ends of the keys 39 and 40 will bear against the angularly disposed sides of the teeth 36 and 38 and thus rotate the members 15 and 16 in opposite directions on the shaft 110 to overcome the action of the spring ring 31 and permit the spring 12 to wind up until its exterior surface is out of contact with the interior surface of the cup 10. In this condition, it will be apparent that the drive shaft 100 is freely rotatable in either direction relative to the driven shaft 110.

If, now, the shift collar 42 and its associated key 40 be left in their left-hand position and the collar 41 together with its associated key 39 be moved to the right to release the tooth 36, the resilient tension of the spring ring 31 will rotate the spring actuating member 15 to unwind the spring 12 until it comes in frictional contact with the cup 10. If the driving shaft 100 and the cup 10 now be rotated under power in the direction of the arrow "A" on Figure 8, it will be apparent that the spring 12 will be further unwound into gripping engagement with the interior of the cup 10 and power will be transmitted through the cup 10, the spring 12 and the spring actuating member 16 to the driven shaft 110 to rotate the same in the direction indicated by the arrow "A".

If the direction of rotation of the driving shaft 100 and the cup 10 be reversed as indicated by the arrow "B" on Figure 8, or if the sense of relative rotation between the shafts 100 and 110 be reversed, it is apparent that the torque effect of the cup 10 will rotate the spring actuating member 15 against the action of the spring ring 31 in a direction to permit the spring 12 to wind up out of frictional contact with the interior of the cup 10 and that the cup 10 will then rotate freely relative to the driven shaft 110 in the direction indicated by the arrow "B", or in the direction opposite to that in which the clutch transmits torque from the drive shaft to the driven shaft as described above.

The fourth operating condition of the clutch illustrated in Figures 8 and 9 is with the shift collar 41 and its associated key 39 in their furthermost left-hand position and the shift collar 42 together with its associated key 40 at their right-hand position, as viewed in Figure 9.

It will be apparent that in this condition of the control elements, the spring actuating member 15 is rigidly held against rotation and the spring actuating member 16 is permitted an amount of free rotation relative to the shaft 110 limited to the difference in the circumferential width of the tooth 38 and the slot 37. If, now, the driving shaft 100 and the cup 10 be rotated under power in the direction of the arrow "B" on Figure 8, the spring 12 will be unwound into gripping relation with the cup 10 in this direction of rotation, the spring ring 31 having, as explained above, first rotated the member 16 to bring the spring 12 into initial frictional contact with the interior of the cup, and power will be transmitted from the shaft 100 and cup 10 through the spring 12, the spring actuating member 15 to the driven shaft 110.

If the direction of rotation of the driving shaft 100 and cup 10 be reversed as indicated by the arrow "A" on Figure 8, or if the sense of relative rotation between the shafts 100 and 110 be reversed, the spring actuating member 15 will be rotated by the torque of the cup 10 in the same direction and the spring will be wound up out of frictional contact with the interior surface of the cup 10, permitting the cup to rotate freely in the direction indicated by the arrow "A" relative to the driven shaft 110.

From the above description it will be observed that the form of clutch illustrated in Figures 8 and 9 has four operative conditions; first, one in which torque will be transmitted in either direction from the drive shaft 100 to the driven shaft 110; second, one in which the drive shaft 100 will rotate freely in either direction relative to the driven shaft 110; third, one in which the drive shaft 100 will drive the driven shaft 110 in the direction indicated by the arrow "A" but will rotate freely relative to the driven shaft in the direction indicated by the arrow "B"; fourth, one in which the drive shaft 100 will drive the driven shaft 110 in the direction indicated by the arrow "B" but in which the drive shaft will rotate freely relative to the driven shaft in the direction of the arrow "A".

From the above description it will be observed that the two forms of clutches illustrated in Figures 1 to 7 inclusive have only two operative conditions, that is, the drive shaft will rotate freely of the driven shaft in either direction or the drive shaft will drive the driven shaft in either direction. The form of clutch illustrated in Figures 8 and 9 has four operative positions, that is, the drive shaft may rotate freely relative to the driven shaft in either direction, the drive shaft may drive the driven shaft in either direction, or the drive shaft may selectively drive the driven shaft in either direction and at the same time rotate freely relative to the driven shaft in the other direction.

There are many instances in which a clutch having a method of operation that falls between these two devices, has particular utility, and in Figure 10 I have illustrated such a device. For example, in a clutch adapted to be inserted between the transmission and driving wheels of an automobile for the purpose of selectively securing free wheeling or a positive drive, it is desirable that the clutch should have two modes of operation; that is, one in which the driving shaft drives the driven shaft in either direction, and one in which the driving shaft drives the driven shaft in one direction but rotates freely relatively to the driven shaft in the other direction, or, in other words, permits free rotation of the driven shaft relative to the driving shaft in the same direction at a higher speed.

In Figure 10 I have shown the driving shaft 112 (left-hand shaft) and the driven shaft 113 (right-hand shaft) having a cup 10 formed on one end thereof into which the end of the shaft 112 extends in substantially the same manner as in the previous constructions. In this case the clutch spring 45 is a right-hand spring having associated with its ends the two actuating members 46 and 47 which have abutments 48 and 49 respectively adapted to engage the respective ends of the spring 45. Projecting from the adjacent faces of the actuating members 46 and 47 are the pins 32 and 33 between which the spring ring 31 acts to normally unwind the spring 45 into frictional engagement with the interior surface of the cup 10 in the manner described above. The actuating member 46, which is the right-hand member illustrated in Figure 10, is provided with a tooth 50 formed thereon which extends into a groove 51 formed in the driving shaft 112, the groove being of greater width than the tooth 50 in order to permit a limited rotation of the actuating member 46 relative to the shaft 112 in a direction to cause the associated abutment 48 to tend to recede from engagement with the adjacent end of the spring 45.

The opposite spring actuating member 47 is freely rotatably mounted upon the driving shaft 112 and has an annular sleeve portion surrounding the shaft 112 extending outwardly from the main clutch structure. This spring actuating member 47 is maintained in operative position in the clutch structure and against axial separation from the spring actuating member 46 by means of an annular thrust plate secured to the cup 10 by means of a flange on the cup and bolts or rivets or other suitable securing means.

In this form of my device the manual control means comprises a shift collar 53 slidably mounted upon the driving shaft 112 adjacent to the outwardly projecting portion of the spring actuating member 47 and maintained against rotation relative to the shaft 112 by means of longitudinal slots formed in the driving shaft and cooperating teeth or keys provided in the shift collar. As clearly illustrated in Figure 10, the shift collar is provided with a longitudinally extending diagonal or helical tongue 54 which cooperates with a similarly shaped notch in the protruding sleeve portion of the member 47 to give the member 47 a limited rotation relative to the shaft 112 upon axial movement of the shift collar 53 relative to the shaft.

From an inspection of Figure 10, it will be observed that with the shift collar in the position therein illustrated the spring ring 31 acting at its ends upon the pins 32 and 33 tends to rotate the spring actuating elements 46 and 47 in opposite directions to unwind the spring 45 into frictional engagement with the interior of the cup 10, the dimensions of the spring 45 and the cup 10 being such that when the exterior surface of the spring is in frictional engagement with the interior surface of the cup 10, the tooth 50 on the member 46 will be centrally located relative to the slot 51. In this condition of the parts it will be observed that if the driving shaft 112 be rotated under power in the direction of the arrow "A" on Figure 10, the spring 45 will be further unwound into gripping relation with the interior surface of the cup 10 and power will be transmitted from the driving shaft 112 through the spring actuating member 47, which is held against rotation relative to the shaft by the shift collar 53, the spring 45, and the cup 10 to the driven shaft 113. If now the direction of rotation of the drive shaft 112 be reversed to the direction indicated by the arrow "B" on Figure 10, or similarly, if the speed of the driven shaft 113 be increased in the direction of the arrow "A" until its rotational speed is greater than the rotational speed of the drive shaft 112, it is apparent that the spring actuating member 46 will be moved by the torque of the driving shaft 112 or the reverse torque of the driven shaft 113 in the direction indicated by the arrow "A" and that the spring 45 will be wound up out of driving engagement with the interior surface of the cup 10 and that the shaft 112 will rotate freely relative to the shaft 113 in the direction of the arrow "B".

If, now, the shift collar 53, as illustrated in Figure 10, be moved to the right, it is apparent that the spring actuating member 47 will be rotated relative to the driving shaft 112 and the spring actuating member 46 in the direction indicated by the arrow "A", thereby bringing the tooth 50 of the member 46 into contact with the edge 51' of the slot 51, at the same time permitting the spring 45 to be unwound into frictional engagement with the interior surface of the cup 10. In this condition of the parts, it is apparent that when the driving shaft 112 is rotated under power in the direction indicated by the arrow "A" the spring actuating member 46 will be moved in the direction indicated by the arrow "B" to unwind the spring into gripping relation with the interior surface of the cup 10 and power may be transmitted from the driving shaft 112 through the spring actuating member 47 and shift collar 53 to the spring 45 and from the spring 45 to the cup 10 which is formed on the end of the driven shaft 113.

If, now, the direction of the driving shaft 112 be reversed to the direction indicated by the arrow "B", it is apparent that the spring actuating member 46 which has been rotated by the shift collar 53 in the direction of the arrow "A" from the position above described, will now permit the spring 45 to unwind into gripping relation with the interior surface of the cup 10 and power will now be transmitted from the driving shaft 112 through the spring actuating member 46 and the spring 45 to the cup 10 which is formed on the driven shaft 113.

It will, therefore, be apparent that in Figure 10 I have provided between a pair of aligned shafts a clutch having two modes of operation; first, one in which power is transmitted from the driving shaft to the driven shaft in one direction of rotation only, and in which the driven shaft may overrun the driving shaft in the same direction at a higher speed, and second, that mode of operation in which the two shafts are rigidly coupled together in both directions of rotation.

While I have illustrated and described a preferred mechanical embodiment of the idea of my invention and three somewhat modified forms thereof, it is to be understood that the invention is not limited to the specific mechanical features illustrated and described and that such changes in the size, shape and arrangement of parts may be resorted to as come within the scope of the sub-joined claims.

Having now described my invention so that others skilled in the art may clearly understand the same, what I desire to secure by Letters Patent is as follows:

I claim as my invention:

1. In combination, a member having a circular recess, a helical clutching element located within said recess and adapted to be expanded into gripping engagement with the wall of said recess when subjected to an unwinding torque, a second member rotatable relatively to said recessed member and co-axial with said recess, means associated with said helical element near each end thereof for limiting relative rotation of said second member and helical element, and provisions for independently adjusting each of said means while the device is in operation to control the extent of relative rotation of said second member and helical element.

2. In combination, a member having a circular recess, a helical clutching element located within said recess and adapted to be expanded into gripping engagement with the wall of said recess when subjected to an unwinding torque, a second member rotatable relatively to said recessed member and co-axial with said recess, means respectively associated with the ends of said helical element for limiting relative rotation of the helical element and said second member in opposite directions, said helical element having when unstressed a diameter such that it exerts substantially no radial pressure on the wall of said recess, and yielding means acting between the ends of said helical element and subjecting it to a torque in a direction to unwind and expand it into operative engagement with the wall of said recess.

3. In combination, a member having a circular recess, a helical clutching element located within said recess and adapted to be expanded into gripping engagement with the wall of said recess when subjected to a unwinding torque, a second member rotatable relatively to said recessed member and co-axial with said recess, means respectively associated with the ends of said helical element for limiting relative rotation of the helical element and said second member in opposite directions, provisions for adjusting said rotation-limiting means to vary the extent of relative rotation of said second member and said helical element, said helical element having when unstressed a diameter such that it exerts substantially no radial pressure on the wall of said recess, and yielding means acting between the ends of said helical element and subjecting it to a torque in a direction to unwind and expand it into operative engagement with the wall of said recess.

4. In combination, a member having a circular recess, a helical clutching element located within said recess and adapted to be expanded into gripping engagement with the wall of said recess when subjected to an unwinding torque, a second member rotatable relatively to said recessed member and co-axial with said recess, said helical element bearing yieldingly against the wall of said recess whereby its rotation relative to said recessed member will be frictionally opposed, means associated with one end of said helical element for limiting with lost-motion its rotation in one direction relative to said second member, and provisions for controlling angular movement of the other end of said helical element relative to said second member.

5. In combination, a member having a circular recess, a helical clutching element located within said recess and adapted to be expanded into gripping engagement with the wall of said recess when subjected to an unwinding torque, a second member rotatable relatively to said recessed member and co-axial with said recess, means respectively associated with the ends of said helical element for limiting relative rotation of the helical element and said second member in opposite directions, said helical element having when unstressed a diameter such that it exerts substantially no radial pressure on the wall of said recess, and yielding means acting against one end of said helical element and reacting against the other end independently of said second member for applying to the helical element an unwinding torque causing it to engage operatively the wall of said recess.

6. In combination, a member having a circular recess, a helical clutching element located within said recess and adapted to be expanded into gripping engagement with the wall of said recess when subjected to an unwinding torque, a second member rotatable relatively to said recessed member and co-axial with said recess, means respectively associated with the ends of said helical element for limiting relative rotation of the helical element and said second member in opposite directions, said helical element having when unstressed a diameter such that it exerts substantially no radial pressure on the wall of said recess, and means acting against one end of said helical element and reacting against the other end independently of said second member for applying to the helical element an unwinding torque causing it to engage operatively the wall of said recess.

7. In combination, a member having a circular friction surface, a helical clutching element associated with said surface and adapted to grip said surface frictionally when subjected to a torque in one direction, a second member rotatable relatively to said first member and co-axial with said surface, means associated with said helical element near each end thereof for limiting relative rotation of said second member and helical element, and provisions for independently adjusting each of said means while the device is in operation to control the extent of relative rotation of said second member and helical element.

8. In combination, a member having a circular friction surface, a helical clutching element associated with said surface and adapted to grip said surface frictionally when subjected to a torque in one direction, a second member rotatable relatively to said first member and co-axial with said surface, means respectively associated with the ends of said helical element for limiting relative rotation of the helical element and said second member in opposite directions, said helical element having when unstressed a diameter such that it exerts substantially no radial pressure on said friction surface, and yielding means acting between the ends of said helical element and subjecting it to a torque in a direction to cause the helical element to grip said friction surface.

9. In combination, a member having a circular friction surface, a helical clutching element associated with said surface and adapted to grip said surface frictionally when subjected to a torque in one direction, a second member rotatable relatively to said first member and co-axial with said surface, means respectively associated with the ends of said helical element for limiting relative rotation of the helical element and said second member in opposite directions, provisions for adjusting said rotation-limiting means to vary the extent of relative rotation of said second member and said helical element, said helical element having when unstressed a diameter such that it exerts substantially no radial pressure on said friction surface, and yielding means acting between the ends of said helical element and subjecting it to a torque in a direction to cause the helical element to grip said friction surface.

10. In combination, a member having a circular friction surface, a helical clutching element associated with said surface and adapted to grip said surface frictionally when subjected to a torque in one direction, a second member rotatable relatively to said first member and co-axial with said surface, said helical element bearing yieldingly against said friction surface whereby its rotation relative to said first member will be frictionally opposed, means associated with one end of said helical element for limiting with lost-motion its rotation in one direction relative to said second member, and provisions for controlling angular movement of the other end of said helical element relative to said second member.

11. In combination, a member having a circular friction surface, a helical clutching element associated with said surface and adapted to grip said surface frictionally when subjected to a torque in one direction, a second member rotatable relatively to said first member and co-axial with said surface, means respectively associated with the ends of said helical element for limiting relative rotation of the helical element and said second member in opposite directions, said helical element having when unstressed a diameter such that it exerts substantially no radial pressure on said friction surface, and yielding means acting against one end of said helical element and reacting against the other end independently of said second member for applying to said helical element a torque in a direction to cause it to engage said friction surface operatively.

12. In combination, a member having a circular friction surface, a helical clutching element associated with said surface and adapted to grip said surface frictionally when subjected to a torque in one direction, a second member rotatable relatively to said first member and co-axial with said surface, means respectively associated with the ends of said helical element for limiting relative rotation of the helical element and said second member in opposite directions, said helical element having when unstressed a diameter such that it exerts substantially no radial pressure on said friction surface, and means acting against one end of said helical element and reacting against the other end independently of said second member for applying to said helical element a torque in a direction to cause it to engage said friction surface operatively.

13. In combination, a member having a circular recess, a helical clutching element located within said recess and adapted to be expanded into gripping engagement with the wall of said recess when subjected to an unwinding torque, a second member rotatable relatively to said recessed member and co-axial with said recess, an actuator operatively engaging said helical element near each end thereof and rotatable relatively to said second member, means for limiting rotation of each actuator relative to said second member in a direction to cause its disengagement from the adjacent end of the helical element, and yielding means for expanding said helical element into gripping engagement with the wall of said recess.

14. In combination, a member having a circular recess, a helical clutching element located within said recess and adapted to be expanded into gripping engagement with the wall of said recess when subjected to an unwinding torque, a second member rotatable relatively to said recessed member and co-axial with said recess, an actuator operatively engaging said helical element near each end thereof and rotatable relatively to said second member, means for limiting rotation of each actuator relative to said second member in a direction to cause its disengagement from the adjacent end of the helical element, and yielding means acting between said actuators and tending to rotate them relatively in a direction to unwind and expand said helical element into gripping engagement with the wall of said recess.

15. In combination, a member having a circular recess, a helical clutching element located within said recess and adapted to be expanded into gripping engagement with the wall of said recess when subjected to an unwinding torque, a second member rotatable relatively to said recessed member and co-axial with said recess, said helical element bearing yieldingly against the wall of said recess whereby its rotation relative to said recessed member will be frictionally opposed, an actuator operatively engaging said helical element near each end thereof and rotatable relatively to said second member, means for limiting rotation of each actuator in a direction to cause its disengagement from the adjacent end of said helical element, and adjustable control means for limiting relative rotation of said second member and each actuator in the opposite direction.

16. In combination, a member having a circular recess, a helical clutching element located within said recess and adapted to be expanded into gripping engagement with the wall of said recess when subjected to an unwinding torque, a second member rotatable relatively to said recessed member and co-axial with said recess, said helical element bearing yieldingly against the wall of said recess whereby its rotation relative to said recessed member will be frictionally opposed, an actuator operatively engaging said helical element near each end thereof and rotatable relatively to said second member, means for limiting rotation of each actuator in a direction to cause its disengagement from the adjacent end of said helical element, and adjustable control means for limiting relative rotation of said second member and one actuator in the opposite direction.

17. In combination, a member having a circular recess, a helical clutching element located within said recess and adapted to be expanded into gripping engagement with the wall of said recess when subjected to an unwinding torque, a second member rotatable relatively to said recessed member and co-axial with said recess, said helical element bearing yieldingly against the wall of said recess whereby its rotation relative to said recessed member will be frictionally opposed, an actuator operatively engaging said helical element near one end thereof, control means operatively interconnecting the other end of said helical element and said second member, and provisions for limiting rotation of said actuator relatively to said second member in a direction to cause its disengagement from the adjacent end of said helical element, said control means being adjustable to vary the angular position of said helical element relatively to said second member.

18. In combination, a member having a circular recess, a helical clutching element located within said recess and adapted to be expanded into gripping engagement with the wall of said recess when subjected to an unwinding torque, a second member rotatable relatively to said recessed member and co-axial with said recess, means associated with said second member and having an abutment engaging one end of said helical element within the projected limits of the cross-section thereof, means associated with said helical element near the opposite end thereof for preventing axial movement of said helical element away from said abutment, said helical element having when unstressed a diameter such that it exerts substantially no radial pressure on the wall of said recess, and auxiliary friction means acting between said first member and one end of said helical element and subjecting it to a torque in a direction to unwind and expand it into gripping engagement with the wall of said recess.

19. In combination, a member having a circular recess, a helical clutching element located within said recess and adapted to be expanded into gripping engagement with the wall of said recess when subjected to an unwinding torque, a second member rotatable relatively to said recessed member and coaxial with said recess, means associated with said second member and having an abutment engaging one end of the helical element within the projected limits of the cross-section thereof, means associated with said helical element near the opposite end thereof for limiting longitudinal movement of said helical element away from said abutment, said helical element having when unstressed a diameter such that it exerts substantially no radial pressure on the wall of said recess, and yielding means acting against one end of said helical element and reacting against the other end for applying to the helical element an unwinding torque causing it to engage operatively the wall of said recess.

20. A device of the class described comprising, driving and driven shafts, a cup on one of said shafts, a helical spring within said cup, actuating members mounted on one of said shafts operable to expand said spring into engagement with said cup, and actuating member controlling means to selectively provide a one-way or a two-way driving connection between said shafts.

21. A device of the class described comprising, driving and driven shafts, a cup on one of said shafts, a helical spring within said cup, actuating members mounted on the other of said shafts operable to expand said spring into engagement with said cup, and means longitudinally movable upon said other shaft controlling said actuating members to selectively provide a one-way or a two-way driving connection between said shafts.

22. A device of the class described comprising, driving and driven shafts, a cup on one of said shafts, a helical spring within said cup, actuating members operatively engaging the ends of said spring mounted on one of said shafts having limited rotation relative thereto operable to expand said spring into engagement with said cup, and actuating member controlling means operable to rotate said actuating members relative to said shafts to selectively provide a one-way or a two-way driving connection between said shafts.

23. A motor vehicle drive comprising, driving and driven shafts, a cup formed on one of said shafts, actuating members mounted on the other of said shafts, a helical spring interposed between said actuating members and said cup operable by the rotation of said actuating members relative to said shafts to expand said spring into engagement with said cup, and operator actuated controlling means associated with said actuating members to selectively provide a one-way or a two-way driving connection between said shafts.

24. A motor vehicle drive comprising, driving and driven shafts, a cup on one of said shafts, a helical spring within said cup, actuating members on the other of said shafts, each actuating member having a portion extending within said spring and a portion engageable with an end of said spring operable to expand said spring into engagement with said cup, and operator controlled means associated with said actuating members to selectively provide through said spring a driving connection between said shafts in either direction.

25. In combination, a pair of aligned shafts, a cup on one of said shafts, a helical spring within said cup adapted to be expanded into gripping engagement with said cup, means on the other of said shafts having an abutment engaging said spring at one end thereof approximately in line with and normal to the helical pitch of said spring, means to constrain said spring against axial movement away from said abutment, and friction means engageable with said cup to expand said spring into engagement therewith to provide a driving connection between said shafts.

26. In combination, a pair of aligned shafts, a cup on one of said shafts, a helical spring within said cup adapted to be expanded into engagement with said cup, means on the other of said shafts engageable with one end of said spring approximately in line with and normal to the helical pitch of said spring to provide a driving connection between said spring and said shafts, and yielding means acting against the opposite end of said spring and re-acting against the first named end of said spring for applying unwinding torque to said spring to thereby cause it to operatively engage said cup.

27. In combination, a drive shaft, a driven shaft, one of said shafts having a cup thereon, a helical spring located within said cup and adapted to be expanded into gripping engagement therewith, means respectively associated with the ends of said spring for limiting relative rotation thereof and said other shaft in opposite directions, and yielding means acting between the ends of said spring subjecting it to a torque in a direction to unwind and expand it into operative engagement with said cup to cause said shafts to rotate at substantially the same speed in the same direction.

In witness whereof, I have hereunto set my hand at Indianapolis, Indiana, this 22nd day of February, A. D. one thousand nine hundred and thirty-one.

WILLIAM B. BARNES.